United States Patent [19]

Yandle, II

[11] Patent Number: 5,472,302

[45] Date of Patent: Dec. 5, 1995

[54] BOLTS HAVING INDICATORS

[76] Inventor: S. E. Yandle, II, 5883 Rhodes Ave., New Orleans, La. 70131

[21] Appl. No.: 302,249

[22] Filed: Sep. 8, 1994

Related U.S. Application Data

[63] Continuation of Ser. No. 66,763, May 24, 1993, abandoned.

[51] Int. Cl.$^6$ .................................................. F16B 31/02
[52] U.S. Cl. .................................. 411/14; 411/8; 411/383; 411/395; 403/27
[58] Field of Search ................................ 411/383, 1, 14, 411/8, 9, 395, 385, 366, 548, 378, 381, 382, 389, 916; 73/761; 403/27, 41; 116/283, 281, DIG. 34, 212

[56] References Cited

U.S. PATENT DOCUMENTS

| | | | |
|---|---|---|---|
| 839,821 | 1/1907 | Dumont | 411/321 |
| 842,450 | 1/1907 | Ennis | 411/948 |
| 1,018,741 | 2/1912 | Davis | 411/916 X |
| 1,358,795 | 11/1920 | Stillwell | 411/321 |
| 2,367,399 | 1/1945 | Isakson | 411/948 |
| 2,400,348 | 5/1946 | Greene | 411/987 |
| 2,729,260 | 1/1956 | Matson | 411/395 |
| 3,159,075 | 12/1964 | Bjork | 411/383 X |
| 3,886,707 | 6/1975 | Heldt | 411/395 X |
| 4,252,167 | 2/1981 | Dessouroux | 411/321 |
| 4,411,549 | 10/1983 | Sheppard | 411/8 X |
| 4,525,114 | 6/1985 | Hirst | 411/395 X |
| 4,709,654 | 12/1987 | Smith | 411/14 X |
| 4,909,685 | 3/1990 | Hirst | 411/14 X |
| 4,991,563 | 2/1991 | Ashley | 411/916 X |
| 5,046,906 | 9/1991 | Bucknell | 411/916 X |
| 5,102,276 | 4/1992 | Gourd | 411/395 |

FOREIGN PATENT DOCUMENTS

| | | | |
|---|---|---|---|
| 698710 | 10/1940 | Germany | 73/761 |
| 745925 | 5/1944 | Germany | 411/8 |
| 1445153 | 8/1976 | United Kingdom | 411/389 |

Primary Examiner—Rodney M. Lindsey
Attorney, Agent, or Firm—Pravel, Hewitt, Kimball & Krieger

[57] ABSTRACT

A bolt includes a movable pin in the center thereof. This pin can freely move up and down in the bolt. If the pin protrudes out of bolt a predetermined distance after the bolt is screwed into a blind bolt hole, then an inspector knows that the bolt is fully engaged. If, on the other hand, the bolt is not fully engaged, the pin will not protrude the predetermined distance out of the bolt. A second embodiment of the similar invention is a stud having an indicator pin. In third and fourth embodiments, the bolts and studs have indicator pins including grease zerks. These grease zerks allow the holes to be filled with grease to prevent damage to the hole due to corrosion.

25 Claims, 3 Drawing Sheets

BOLTS HAVING INDICATORS

This is a continuation of application Ser. No. 08/066,763 filed on May 24, 1993, now abandoned.

BACKGROUND OF THE INVENTION

1. Field of the Invention

The present invention relates to bolts and threaded studs. More particularly, the present invention relates to novel bolts and threaded studs having indicating means for indicating when the bolt or stud is fully engaged in a blind hole.

2. General Background of the Invention

High-pressure vessels use bolts to hold down covers. When studs or bolts are not fully engaged in their bolt holes, the structural integrity of high pressure dome tank cars is compromised. These bolts are usually screwed into "blind" holes (that is, holes which do not protrude through the wall of the vessel, but instead are closed at the bottom). Due to the high pressure of the contents of the vessels, it is desirable to have as many threads of the bolt as possible engaging the threads of the hole. Therefore, it is desirable to use as long a bolt as possible for a given hole. However, it is not easy to determine whether the bolt in a given hole is as long as possible.

The present invention was conceived to solve the problem of field inspection of high-pressure domes on railway tank cars. Currently, inspection of bolts and studs on these tank cars is done electronically using expensive equipment and skilled personnel.

SUMMARY OF THE INVENTION

The apparatus of the present invention solves the problems confronted in the art in a simple and straightforward manner. The present invention allows the inspection of studs and bolts to determine if they are fully engaged within a receptacle.

The present invention allows for the visual inspection of bolts and studs to determine if the bolts and studs are fully engaged. Visual inspection of bolts and studs is less costly than electronic inspection. Costs are reduced by eliminating the need for expensive electronic equipment and skilled personnel.

To allow an inspector to easily determine whether the bolt in a given hole is the longest bolt which could fit in that hole (i.e., to determine whether the bolt is fully engaged within the hole), the present inventor has added a movable pin in a bolt. This pin can freely move longitudinally in the bolt. If the pin protrudes out of bolt a predetermined distance after the bolt is screwed into a bolt hole, then the inspector knows that the bolt is fully engaged. If, on the other hand, the bolt is not fully engaged, the pin will not protrude the predetermined distance out of the bolt. A second embodiment of the invention is a stud having an indicator pin. In third and fourth embodiments, the bolts and studs have indicator pins including grease zerks and longitudinal bores. Grease can travel through the grease zerks and longitudinal bores. The grease zerks and longitudinal bores allow the holes to be filled with grease to prevent damage to the hole due to corrosion.

The visual inspection of bolts and studs of the present invention is accomplished by simply checking the indicator pin in the center of the bolt or stud. If the indicator is in the up position then the bolt or stud is fully engaged. If the indicator is not in the up position then the bolt or stud should be checked.

The present invention could prevent many leaks and accidents that occur due to the improper tightening of pressure domes.

The present invention can be used in any industry that desires a simple and safe way to check bolts and studs for full engagement of threads in a blind receptacle.

The concept of the "Direct View"™ indicator studs and bolts is to allow an inspector to make a visual inspection to determine that the bolt or stud is fully engaged with the receptacle (bottomed out in the hole). The "Direct View"™ indicator studs and bolt of the present invention are equipped with an indicator in the center of the stud or bolt that rises, for example, ⅛" to 3/16" when the bolt or stud has bottomed out in the hole. If for some reason the bolt or stud has not bottomed out, the indicator will be flush with the top of the bolt or stud (or at least not up the full, predetermined amount). The inspector then will know that it should be checked.

The studs and bolts of the present invention can be used in any application where visual inspection is needed for added safety.

The studs and bolts can be coded for length. The receptacle can have a corresponding code for easy matching.

The indicators do not weaken the tensile strength of the bolts or studs in which they are installed.

The bolts and studs of the present invention are applicable wherever direct view inspection would be an assist to safety.

The indicator bolts and studs of the present invention allow an inspector to determine if the bolt or stud is fully engaged in the receptacle by checking if the pin is in the up or down position. If the pin is in the up position and the inspector wants to check the bolt or stud engagement he need only lightly tap the pin. If the pin remains in the up position he can be certain that the threads are fully engaged. If, on the other hand, the pin moves downward, then the inspector knows that the bolt or stud is not fully engaged.

The studs and bolts of the present invention have a simple but effective means for determining that a stud or bolt has fully engaged the threads within its corresponding bolt hole. Inspection is quick and easy, just requiring a visual and manual check of the indicator pin. If the pin is in the full up position and cannot be moved either up or down, then the stud or bolt is fully engaged in its bolt hole (the bottom of the hole will prevent downward travel of the pin and the upper end of the larger diameter portion of the bore in which the indicator pin is situated will prevent upward travel of the pin when the bolt or stud is fully engaged).

The present invention provides simple mechanical indication of the condition of a stud or bolt. It eliminates the need for costly inspection equipment. It makes inspection quick and less expensive. It reduces maintenance time.

It is an object of the present invention to provide a bolt having means to allow an inspector to quickly tell whether the bolt is the longest bolt which would fit in a given hole and whether the bolt is seated properly.

It is a further object of the present invention to provide a threaded stud having means to allow an inspector to quickly tell whether the stud is seated properly.

It is another object of the present invention to provide bolts and threaded stud having indicator pins with incorporated grease zerks.

BRIEF DESCRIPTION OF THE DRAWING

For a further understanding of the nature, objects, and advantages of the present invention, reference should be had to the following detailed description, read in conjunction with the following drawings, wherein like reference numerals denote like elements and wherein.

Figure 3:
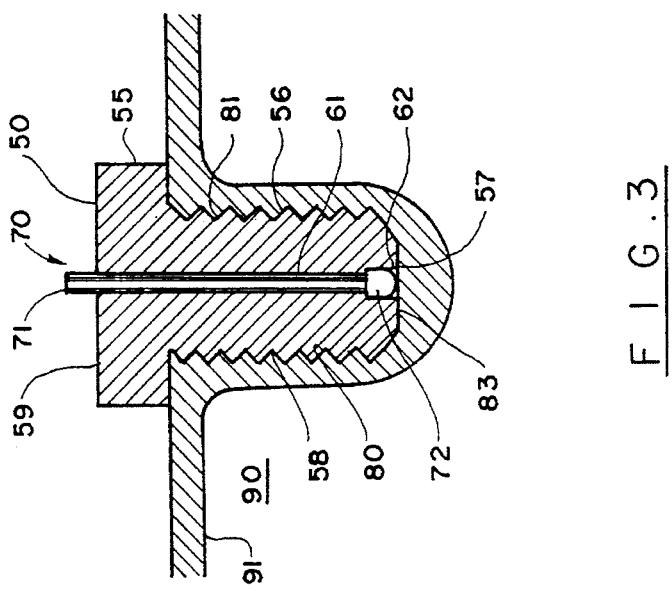
FIG. 3 shows the bolt of FIG. 1 fully engaged in a blind bolt hole.

PARTS LIST:

The following is a list of suitable parts and materials for the various elements of the preferred embodiment of the present invention.
10 bolt of the preferred embodiment of the present invention
11 indicator pin in bolt 10
20 bolt
21 indicator pin in bolt 20
22 stud
23 nut
24 grease zerks
25 head of bolt 20
26 threaded part of shaft 28
27 indicator pin in stud 22
28 shaft of bolt 20
29 longitudinal bore in indicator pins 21
30 cover
31 blind hole in wall 39
32 blind hole in wall 39
33 blind hole in wall 39
34 blind hole in wall 39
35 hole in cover 30
36 hole in cover 30
37 hole in cover 30
38 hole in cover 30
39 wall of a pressure vessel
40 threaded stud
41 indicator pin in threaded stud 40
42 nuts
46 threaded portion of shaft 48
47 second end of stud 40
48 shaft of stud 40
49 first end of stud 40
50 bolt
55 head of bolt 50
56 threads of shaft 58
57 second end of bolt 50
58 shaft of bolt 50
59 first end of bolt 50
60 longitudinally extending bore in bolt 50
61 first, smaller diameter portion of bore 60
62 second, larger diameter portion of bore 60
70 indicator pin of bolt 50
71 first, smaller diameter portion of pin 70
72 second, larger diameter portion of pin 70
80 blind bolt hole
81 threads of bolt hole 80
82 first, open end of hole 80
83 second, closed end of hole 80
90 interior of vessel into which blind hole 80 protrudes
100 indicator stud
101 threaded portion of stud 100
102 unthreaded bottom portion of stud 100
103 indicator pin in stud 100
105 blind hole
140 threaded stud
141 indicator pin in threaded stud 140
146 threaded portion of shaft 148
147 second end of stud 140
148 shaft of stud 140
149 first end of stud 140

DETAILED DESCRIPTION OF THE PREFERRED EMBODIMENT

Figure 2:
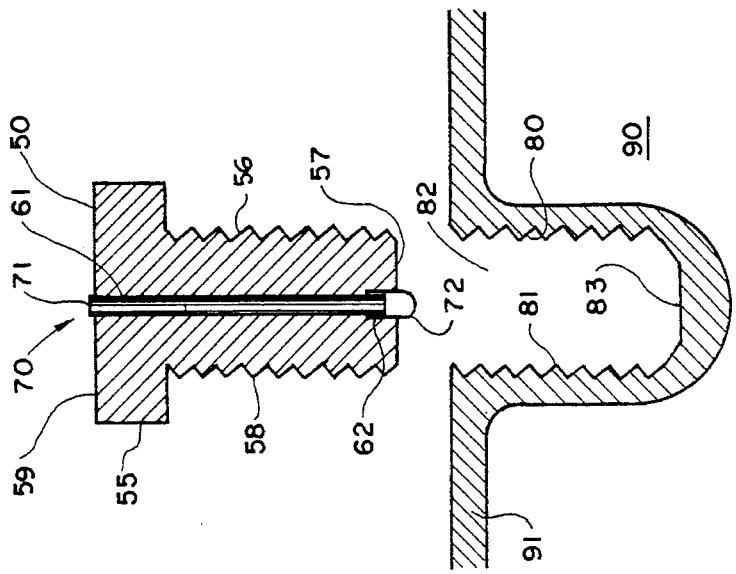
FIG. 2 is a cross-sectional view of a bolt of the present invention prior to engagement in a blind hole.
Figure 1:
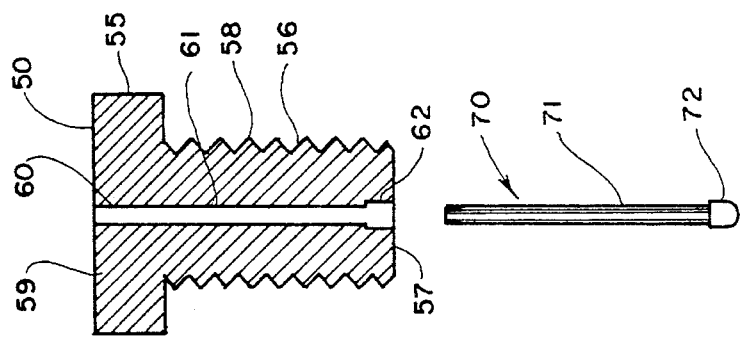
FIG. 1 is an exploded, cross-sectional view of a first embodiment of the apparatus of the present invention.

FIGS. 1 through 3 show the basic functioning of the threaded fasteners of the present invention.

FIGS. 1–3 show a bolt 50 and a blind bolt hole 80. Bolt 50 has a first end 59 and a second end 57. Adjacent the first end 59 of bolt 50 is a head 55 for turning the bolt. There is a threaded shaft 58 between head 55 and the second end 57. Shaft 58 has threads 56 which engage threads 81 of bolt hole 80.

Bolt 50 has a longitudinally extending bore 60 in the center thereof. Bore 60 has a first, smaller diameter portion 61 and a second, larger diameter portion 62. Slidingly received in bore 60 is an indicator pin 70. Indicator pin 70 has a first, smaller diameter portion 71 and a second, larger diameter portion 72.

Blind bolt hole 80 protrudes into the interior 90 of a pressure vessel 91. Blind hole 80 has a first, open end 82 and a second, closed end 83. When bolt 50 is properly engaged in hole 80, and the second end 57 of bolt 50 is bottomed out against the second, closed end 83 of bolt hole 80, indicator pin 70 protrudes a predetermined distance (for example, ⅛") above the first end 59 of bolt 50.

Having an indicator pin 70 of two different diameters prevents the pin from being removable when bolt 50 is engaged in hole 80.

Figure 4:
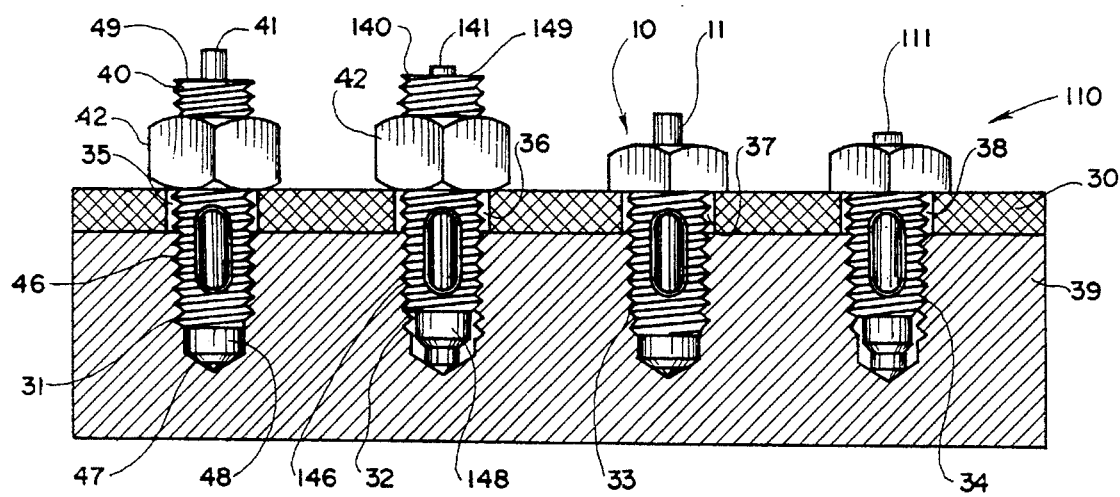
FIG. 4 shows the bolts and studs of the preferred embodiment of the present invention in various degrees of engagement in blind bolt holes, with part of the bolt shafts being cut away to show the indicator pins therein.
Figures 5, 6, 7, 8:
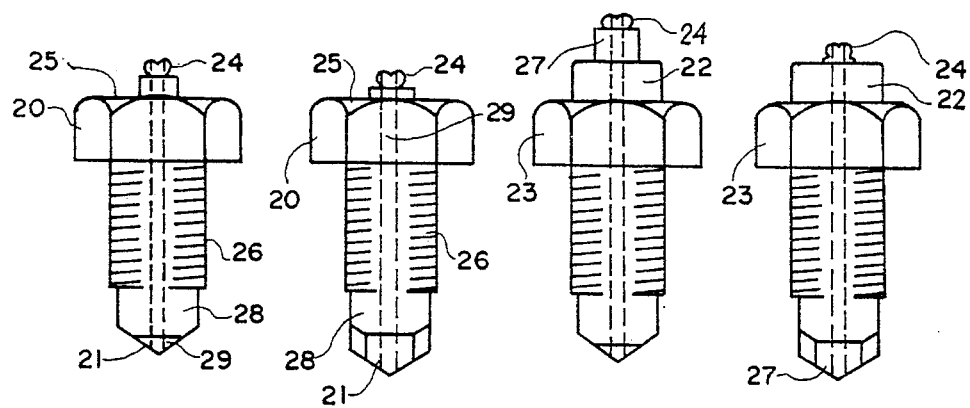
FIG. 5 shows an embodiment of the present invention fully engaged in a blind bolt hole.
FIG. 6 is a view similar that of FIG. 5 but without full engagement of the threads of the hole with those of the bolt.
FIGS. 7 and 8 are similar to FIGS. 5 and 6, but instead show threaded studs.

FIG. 4 shows bolts 10 and 110 and studs 40 and 140 being used to hold down a cover 30 on a wall of a pressure vessel. Stud 40 passes through hole 35 in cover 30 and engages blind hole 31 of wall 39. Bolt 10 passes through hole 37 in cover 30 and engages blind hole 33 of wall 39. Bolt 110 passes through hole 38 in cover 30 and engages blind hole 34 of wall 39.

Bolt 10 shown in FIG. 4 includes a movable pin 11. Pin 11 can freely move up and down longitudinally in bolt 10. If pin 11 protrudes out of bolt 10 a predetermined distance after bolt 10 is screwed into the bolt hole 33, then the inspector knows that bolt 10 is fully engaged (see FIG. 4). If, on the other hand, the bolt is not fully engaged, the pin will not protrude the predetermined distance out of the bolt (see pin 111 in bolt 110 in FIG. 4). As in bolt 50, bolt 10 has a central longitudinal bore having two different diameters and like indicator pin 70, indicator pin 11 has a smaller diameter upper portion and a larger diameter upper portion to prevent pin 11 from being removed once bolt 10 is engaged in hole 33.

Nuts 42 are used to insert studs 40 and 140 into threaded blind holes 31 and 32. Stud 40 includes a shaft 48 having a threaded portion 46. Stud 40 has a first end 49 and a second end 47. Indicator pin 41 can be identical to indicator pin 11 except as to its length (indicator pin 41 is longer). Threaded stud 40 is properly engaged in hole 31, as indicated in FIG. 4. The second end 47 of stud 40 is bottomed out against the bottom end of hole 31, and pin 41 is protruding a predetermined distance out of the first end 49 of stud 40.

On the other hand, threaded stud 140 is not properly engaged in hole 32. As can be seen, threaded portion 146 of shaft 148 does not engage all of the threads of hole 32. The second end 147 of stud 140 is not bottomed out against the bottom of hole 32, and thus indicator pin 141 does not protrude a predetermined distance above the first end 149 of stud 140.

FIGS. 5–8 show bolts 20 and studs 22 having indicator pins including grease zerks 24. These grease zerks 24 allow the holes to be filled with grease to prevent damage to the hole due to corrosion. The indicator pins (21 and 27) shown in FIGS. 5–8 are similar to indicator pin 11, but include a grease zerk 24 at the first end thereof and include a longitudinal bore in the center thereof. Longitudinal bore 29 of indicator pin 21 allows grease to flow from a grease gun through grease zerk 24 and out of the second end of the indicator pin 21 into the hole in which bolt 20 is engaged.

Bolt 20 has a head 25 at a first end thereof, a shaft 28 having a threaded part 26, and an indicator pin 21 in a longitudinal bore similar to bore 60 shown in FIG. 1.

Stud 22 works in a similar manner to that of bolt 20, and includes an indicator pin 27 the same in all respects to indicator pin 21 except that indicator pin 27 is longer. Nut 23 is used to turn stud 22.

Figure 9:
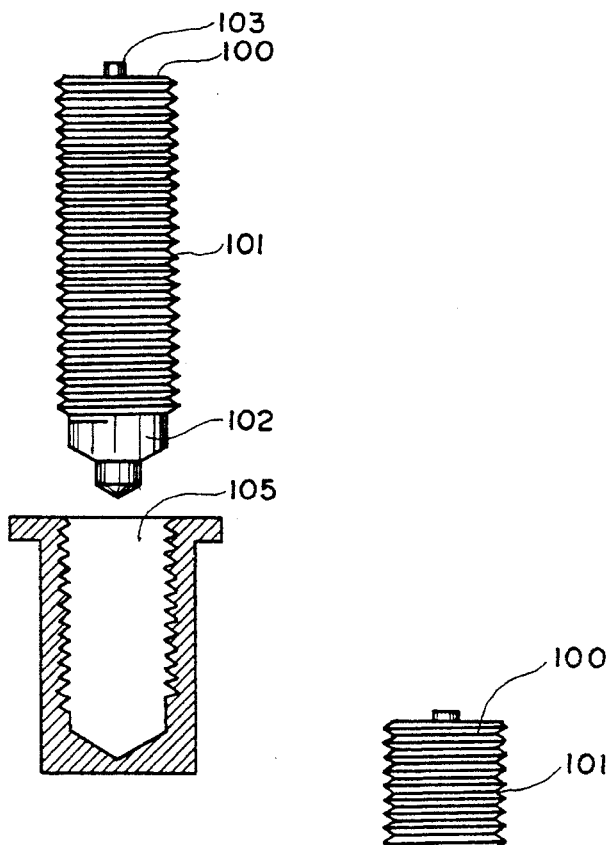
FIGS. 9–11 show various stages of engagement of a threaded stud of the present invention and a blind bolt hole.
Figure 10:
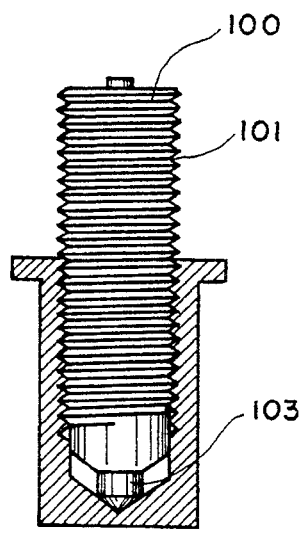
Figure 11:
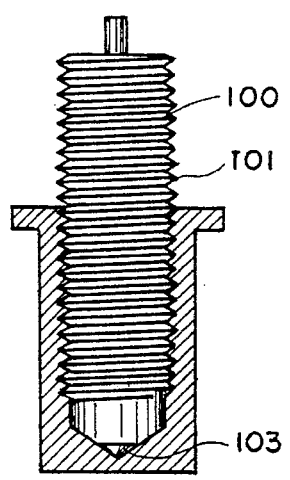

FIGS. 9–11 show an indicator stud 100 of the present invention. Indicator stud includes a threaded portion 101 and an unthreaded bottom portion 102. There is an indicator pin 103 in stud 100.

First stud 100 is threaded in the blind bolt hole 105. The indicator pin 103 rises as the stud 100 reaches the bottom of hole 105 (FIG. 10). When the stud 100 is tight, and the indicator pin 103 is in its full up position, and pin 103 cannot be moved either up or down, then the stud is fully engaged in the hole.

As can be seen in the drawing figures, the indicator pins do not impede full engagement of the threads of the threaded openings with the threads of the threaded fasteners. Also, as can be seen in the drawing figures, the indicator pins are longer than the shafts.

A 1⅛"–7nc×4½" L7 double end stud was tested and found to have a tensile strength of 131 KSI, which exceeds ASTM requirements of minimum 125 KSI for ASTM A320 grade.

While some of the drawings herein show studs or bolts fully engaged in blind holes without anything in between the top of the bolt and the top of the hole, normally the bolts or studs would be used to hold down a cover, as shown in FIG. 4. In such a case, of course, the bolt would be inserted in a hole in the cover before being inserted in the blind hole.

The studs and bolts of the present invention can be made of materials, such as stainless steel, which are normally used for studs and bolts.

Bolts 10, 20, and 50, and threaded stud 40 can be considered "bolt means". Shafts 28, 48, and 58 can be considered "shaft means". Heads 25 and 55, for example, can be considered "head means".

The present inventor contemplates using the indicator pins of the present invention with all types of studs and bolts, including re-threader studs and bolts (that is, studs and bolts which cut new threads into a stripped hole when they are inserted into the hole).

The foregoing embodiments are presented by way of example only; the scope of the present invention is to be limited only by the following claims.

I claim:

1. A bolt means comprising:

(a) a shaft means having a first end, a second end, and a length;

(b) thread means on the shaft means for engaging a threaded opening having threads, a first, open end and a second, closed end;

(c) indicator means in the shaft means for indicating when the threads of the threaded opening are fully engaged by the indicator means includes a longitudinal bore in the shaft means having an indicator pin slidingly received therein;

the indicator pin has an end having a diameter smaller than that of the longitudinal bore to allow the pin to slide into and out of the bore from an end of the bore.

2. The bolt means of claim 1, wherein:

the shaft means is a threaded stud.

3. The bolt means of claim 1, further comprising:

(d) head means for turning the shaft means.

4. The bolt means of claim 1, wherein:

the indicator means protrudes a predetermined distance of ⅛' to 3/16' above the first end of the shaft means when the second end of the shaft means engages the second end of the threaded opening.

5. The bolt means of claim 1, wherein:

the longitudinal bore has a first diameter and a second diameter, and the indicator pin has a third diameter and a fourth diameter, wherein the first diameter is smaller than the second diameter, the third diameter is smaller than the fourth diameter, the first diameter is larger than the third diameter, the second diameter is larger than the fourth diameter, and the fourth diameter is larger than the first diameter.

6. The bolt means of claim 1, wherein:

the indicator pin protrudes a predetermined distance above the first end of the shaft means when the threads of the threaded opening are fully engaged with the thread means of the shaft means.

7. The bolt means of claim 1, wherein:

the longitudinal bore is in the center of the shaft means.

8. The bolt means of claim 1, further comprising:

means for preventing removal of the indicator pin from the longitudinal bore when the bolt means is engaged in the threaded opening.

9. The bolt means of claim 1, wherein:

the indicator pin does not prevent the threads of the threaded opening from becoming fully engaged with the thread means of the bolt means.

10. The bolt means of claim 1, further comprising:

a grease zerk at a first end of the indicator pin; and means for allowing grease to pass through the indicator pin to the second end of the shaft means.

11. A threaded fastener comprising:

(a) a shaft having a first end, a second end, and a length;

(b) threads for engaging a threaded opening having a first, open end and a second, closed end;

(c) a longitudinal bore in the shaft;

(d) an indicator pin for indicating when the second end of the shaft of the threaded fastener engages the second end of the threaded opening, the indicator pin being slidingly received in the bore and having a length greater than the length of the shaft the indicator pin has an end having a diameter smaller than that of the longitudinal bore to allow the pin to slide into and out of the bore from an end of the bore.

12. The threaded fastener of claim 11, wherein:

the longitudinal bore has a first diameter and a second diameter; and the indicator pin has a third diameter and a fourth diameter, wherein the first diameter is smaller than the second diameter, the third diameter is smaller than the fourth diameter, the first diameter is larger than the third diameter, the second diameter is larger than the fourth diameter, and the fourth diameter is larger than the first diameter.

13. The threaded fastener of claim 11 wherein:

the longitudinal bore is in the center of the shaft.

14. The threaded fastener of claim 11 wherein:

the indicator pin protrudes a predetermined distance above the first end of the shaft when the second end of the shaft of the threaded fastener engages the second end of the threaded opening.

15. The threaded fastener of claim 14, wherein:

the predetermined distance is ⅛' to 3/16'.

16. A threaded fastener comprising:

(a) a shaft having a first end, a second end, and a length;

(b) threads on the shaft for engaging a threaded opening having a first, open end and a second, closed end;

(c) a longitudinal bore in the shaft;

(d) an indicator pin for indicating when the threads of the threaded opening are fully engaged by threads on the shaft, the indicator pin being slidingly received in the bore and having a length greater than the length of the shaft the indicator pin has an end having a diameter smaller than that of the longitudinal bore to allow the pin to slide into and out of the bore from an end of the bore.

17. The threaded fastener of claim 16, wherein:

the indicator pin protrudes a predetermined distance above the first end of the shaft when the threads of the threaded opening are fully engaged with the threads of the shaft.

18. The threaded fastener of claim 16, wherein:

the longitudinal bore has a first diameter and a second diameter; and the indicator pin has a third diameter and a fourth diameter, wherein the first diameter is smaller than the second diameter, the third diameter is smaller than the fourth diameter, the first diameter is larger than the third diameter, the second diameter is larger than the fourth diameter, and the fourth diameter is larger than the first diameter.

19. The threaded fastener of claim 16 wherein:

the longitudinal bore is in the center of the shaft.

20. The threaded fastener of claim 16, further comprising:

means for preventing removal of the indicator pin from the longitudinal bore when the threaded fastener is engaged in the threaded opening.

21. The threaded fastener of claim 16, wherein:

the indicator pin does not prevent the threads of the threaded opening from becoming fully engaged with the threads of the threaded fastener.

22. The threaded fastener of claim 16, further comprising:

a grease zerk at a first end of the indicator pin; and means for allowing grease to pass through the indicator pin to the second end of the shaft.

23. The threaded fastener of claim 16, wherein:

the shaft is a threaded stud.

24. The threaded fastener of claim 16, further comprising:

(d) a head for turning the shaft.

25. The threaded fastener of claim 17, wherein:

the predetermined distance is ⅛' to 3/16".

* * * * *